(12) United States Patent
Xu et al.

(10) Patent No.: US 10,251,066 B2
(45) Date of Patent: Apr. 2, 2019

(54) EVOLVED MACHINE TYPE COMMUNICATION DESIGN FOR SHARED RADIO FREQUENCY SPECTRUM OPERATION

(71) Applicant: QUALCOMM Incorporated, San Diego, CA (US)

(72) Inventors: Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/068,789

(22) Filed: Mar. 14, 2016

(65) Prior Publication Data

US 2016/0316374 A1    Oct. 27, 2016

Related U.S. Application Data

(60) Provisional application No. 62/152,768, filed on Apr. 24, 2015.

(51) Int. Cl.
*H04W 4/70* (2018.01)
*H04W 16/14* (2009.01)
(Continued)

(52) U.S. Cl.
CPC ............ *H04W 16/14* (2013.01); *H04W 4/70* (2018.02); *H04W 74/0816* (2013.01); *H04W 72/0453* (2013.01)

(58) Field of Classification Search
CPC .. H04W 16/14; H04W 4/005; H04W 72/0453
See application file for complete search history.

(56) References Cited

U.S. PATENT DOCUMENTS 8,811,203 B1    8/2014  Liu et al.
2013/0195073 A1  8/2013  Chen et al.
(Continued)

OTHER PUBLICATIONS

International Search Report and Written Opinion—PCT/US2016/022444—ISA/EPO—dated Jun. 24, 2016.
(Continued)

*Primary Examiner* — Nam T Huynh
(74) *Attorney, Agent, or Firm* — Patterson & Sheridan, LLP

(57) ABSTRACT

Aspects of the present disclosure provide techniques utilizing shared radio frequency spectrum (SRFS) for certain devices, such as machine type communication(s) (MTC) user equipments (UEs) and evolved or enhanced MTC (eMTC) UEs. An exemplary method, performed, for example, by a base station (BS), includes performing a channel clear assessment (CCA) for at least a portion of the SRFS including one or more narrowband regions, and communicating with at least one MTC UE, after performing the CCA, on at least one of the narrowband regions. A second exemplary method, performed, for example, by a MTC UE, generally includes receiving, from a BS, an assignment of resources in a narrowband region of the SRFS band for the MTC UE to use for communicating with the BS, and communicating with the BS on the narrowband region without performing a CCA for the narrowband region. A third exemplary method, performed, for example, by a MTC UE, generally includes performing a CCA for a narrowband region of the SRFS band and communicating with a BS on the narrowband region.

26 Claims, 9 Drawing Sheets

(51) Int. Cl.
*H04W 74/08* (2009.01)
*H04W 72/04* (2009.01)

(56) References Cited

U.S. PATENT DOCUMENTS

| | | |
|---|---|---|
| 2013/0301524 A1 | 11/2013 | Xu et al. |
| 2013/0315152 A1* | 11/2013 | Ratasuk ............. H04W 76/023 370/329 |
| 2014/0313999 A1 | 10/2014 | Xu et al. |
| 2014/0341018 A1 | 11/2014 | Bhushan et al. |
| 2016/0142920 A1* | 5/2016 | Suzuki ................. H04W 16/14 370/336 |

OTHER PUBLICATIONS

Panasonic, et al., "Way Forward on Discovery Signal for LAA," 3GPP Draft; R1-151174, 3rd Generation Partnership Project (3GPP), Mobile Competence Centre; 650, Route Des Lucioles; F-06921 Sophia-Antipolis Cedex; France, vol. RAN WG1, No. Paris, France; Mar. 24-26, 2015, Mar. 26, 2015, XP050951532, Retrieved from the Internet URL: http://www.3gpp.org/ftp/tsg_ran/WG1_RL1/TSGR1_AH/LTE_LAA_1503/Docs/ [retrieved on Mar. 26, 2015] p. 2-p. 5.

\* cited by examiner

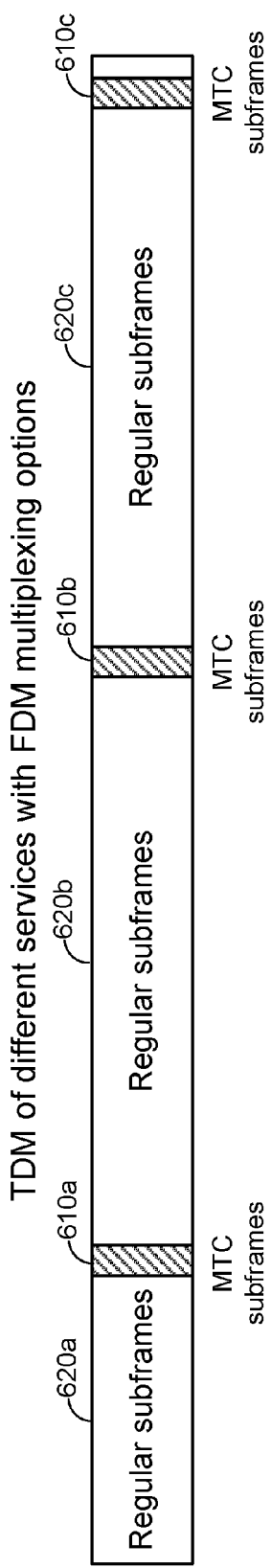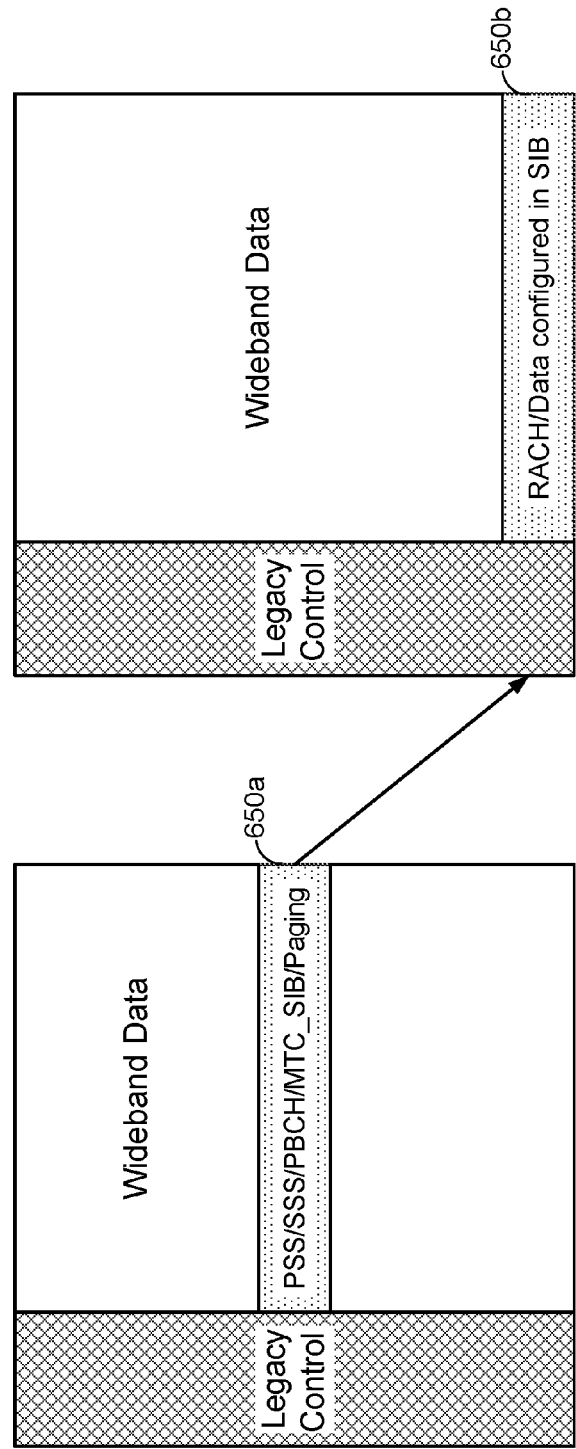
FIG. 6A
FIG. 6B

EVOLVED MACHINE TYPE COMMUNICATION DESIGN FOR SHARED RADIO FREQUENCY SPECTRUM OPERATION

CROSS-REFERENCE TO RELATED APPLICATIONS

The present Application for Patent claims priority to U.S. Provisional Application No. 62/152,768, filed Apr. 24, 2015, which is assigned to the assignee of the present application and hereby expressly incorporated by reference herein in its entirety.

BACKGROUND

Field of the Disclosure

Certain aspects of the present disclosure generally relate to wireless communications and, more particularly, to evolved or enhanced machine type communication(s) (eMTC) operations in shared radio frequency spectrum (SRFS).

Description of the Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

Shared radio frequency spectrum (SRFS) includes radio frequency spectrum that is unlicensed, and thus usable by large number and variety of devices, including, for example, Wi-Fi devices operating according to versions of the IEEE 802.11 standard. Devices utilizing SRFS may perform listen before talk (LBT) operations. LBT is generally the operation of receiving for a short period of time on a frequency band and determining that no other device is transmitting on that frequency band before transmitting on that frequency band.

SUMMARY

Certain aspects of the present disclosure provide techniques and apparatus for utilizing shared radio frequency spectrum (SRFS) for certain devices, such as machine type communication (MTC) UEs and evolved machine type communication (eMTC) UEs.

Certain aspects of the present disclosure provide a method for wireless communications by a base station (BS) using a shared radio frequency spectrum (SRFS) band. The method generally includes performing a channel clear assessment (CCA) for at least a portion of the SRFS including one or more narrowband regions, and communicating with at least one machine type communications (MTC) user equipment (UE), after performing the CCA, on at least one of the narrowband regions.

Certain aspects of the present disclosure provide a method for wireless communications by a machine type communications (MTC) user equipment (UE) using a shared radio frequency spectrum (SRFS) band. The method generally includes receiving, from a base station (BS), an assignment of resources in a narrowband region of the SRFS band for the MTC UE to use for communicating with the BS, and communicating with the BS on the narrowband region without performing a clear channel assessment (CCA) for the narrowband region.

Certain aspects of the present disclosure provide a method for wireless communications by a machine type communications (MTC) user equipment (UE) using a shared radio frequency spectrum (SRFS) band. The method generally includes performing a clear channel assessment (CCA) for a narrowband region of the SRFS band and communicating with a base station (BS) on the narrowband region.

Certain aspects of the present disclosure provide an apparatus for wireless communications using a shared radio frequency spectrum (SRFS) band. The apparatus generally includes at least one processor configured to perform a channel clear assessment (CCA) for at least a portion of the SRFS including one or more narrowband regions and to communicate with at least one machine type communications (MTC) user equipment (UE), after performing the CCA, on at least one of the narrowband regions. The apparatus may further include a memory coupled to the at least one processor.

Certain aspects of the present disclosure provide an apparatus for wireless communications using a shared radio frequency spectrum (SRFS) band. The apparatus generally includes at least one processor configured to receive, from a base station (BS), an assignment of resources in a narrowband region of the SRFS band for the MTC UE to use for communicating with the BS and to communicate with the BS on the narrowband region without performing a clear channel assessment (CCA) for the narrowband region. The apparatus may further include a memory coupled to the at least one processor.

Certain aspects of the present disclosure provide an apparatus for wireless communications using a shared radio frequency spectrum (SRFS) band. The apparatus generally includes at least one processor configured to perform a clear channel assessment (CCA) for a narrowband region of the SRFS band and to communicate with a base station (BS) on the narrowband region. The apparatus may further include a memory coupled to the at least one processor.

Certain aspects of the present disclosure provide an apparatus for wireless communications using a shared radio frequency spectrum (SRFS) band. The apparatus generally includes means for performing a channel clear assessment (CCA) for at least a portion of the SRFS including one or more narrowband regions and means for communicating with at least one machine type communications (MTC) user equipment (UE), after performing the CCA, on at least one of the narrowband regions.

Certain aspects of the present disclosure provide an apparatus for wireless communications using a shared radio frequency spectrum (SRFS) band. The apparatus generally includes means for receiving, from a base station (BS), an assignment of resources in a narrowband region of the SRFS band for the MTC UE to use for communicating with the BS and means for communicating with the BS on the narrowband region without performing a clear channel assessment (CCA) for the narrowband region.

Certain aspects of the present disclosure provide an apparatus for wireless communications using a shared radio frequency spectrum (SRFS) band. The apparatus generally includes means for performing a clear channel assessment (CCA) for a narrowband region of the SRFS band and means for communicating with a base station (BS) on the narrowband region.

Certain aspects of the present disclosure provide a computer-readable medium storing computer executable code. The computer executable code generally includes code to perform a channel clear assessment (CCA) for at least a portion of the SRFS including one or more narrowband regions and code to communicate with at least one machine type communications (MTC) user equipment (UE), after performing the CCA, on at least one of the narrowband regions.

Certain aspects of the present disclosure provide a computer-readable medium storing computer executable code. The computer executable code generally includes code to receive, from a base station (BS), an assignment of resources in a narrowband region of the SRFS band for the MTC UE to use for communicating with the BS and code to communicate with the BS on the narrowband region without performing a clear channel assessment (CCA) for the narrowband region.

Certain aspects of the present disclosure provide a computer-readable medium storing computer executable code. The computer executable code generally includes code to perform a clear channel assessment (CCA) for a narrowband region of the SRFS band and code to communicate with a base station (BS) on the narrowband region.

BRIEF DESCRIPTION OF THE DRAWINGS

FIGS. 6A and 6B illustrate an example of MTC co-existence within a wideband system, such as LTE, in accordance with certain aspects of the present disclosure.

DETAILED DESCRIPTION

Figure 1:
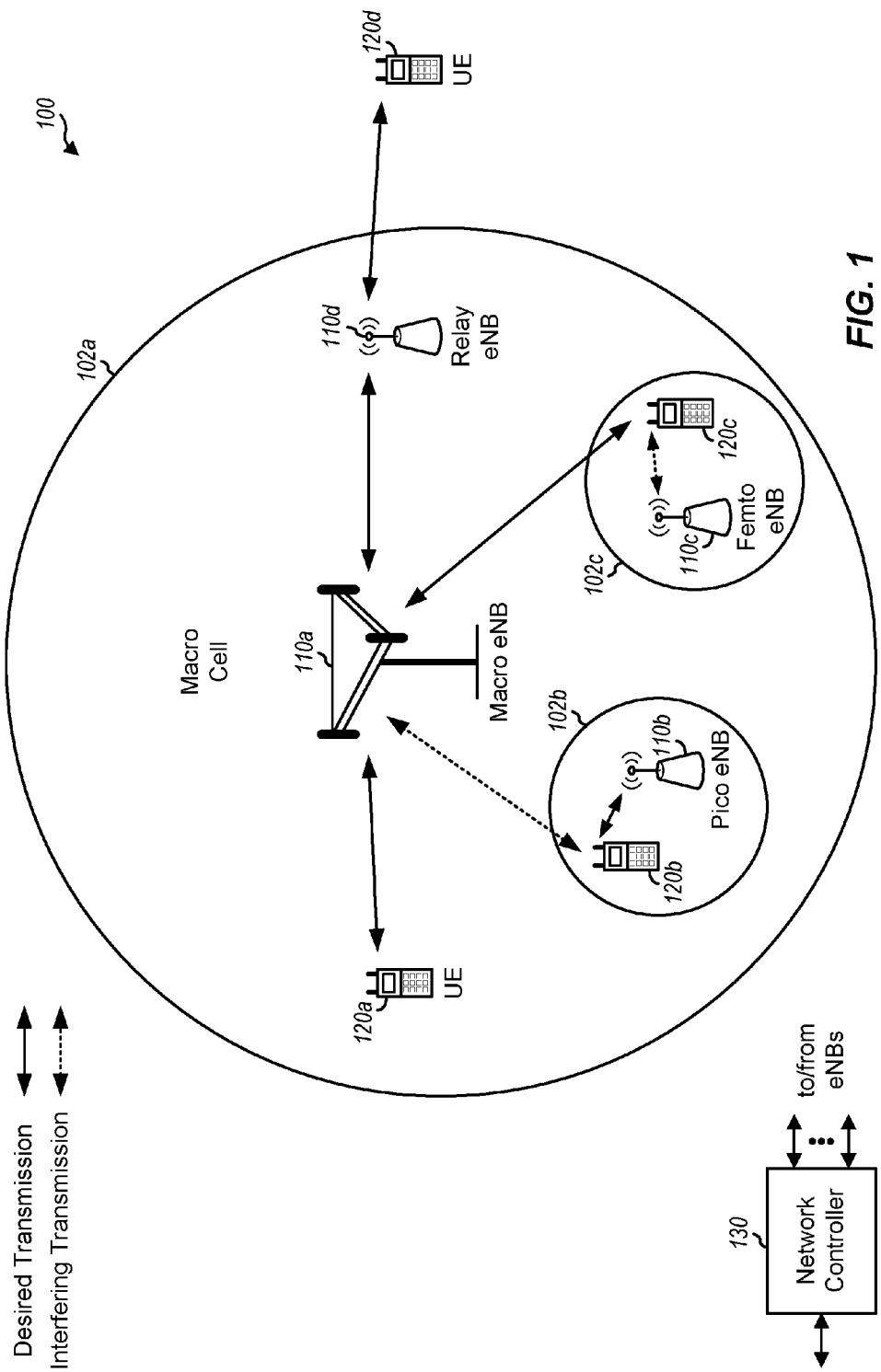
FIG. 1 is a block diagram conceptually illustrating an example of a wireless communication network, in accordance with certain aspects of the present disclosure.

Aspects of the present disclosure provide techniques that may help enable communication between a base station (BS) and machine type communication (MTC) based user equipments (UEs) using shared radio frequency spectrum (SRFS). For example, the techniques may provide techniques for reserving a narrowband (e.g., a six physical resource block (PRB)) region for communications between a BS and an MTC UE. Techniques for performing clear channel assessment (CCA), a type of LBT, while communicating in a narrowband region of SRFS are also provided.

As used herein, a "narrowband region" may refer to a 1.08 MHz (e.g., 6 resource blocks (RBs)) narrowband region of a larger system bandwidth and/or a smaller narrowband region (e.g., 180 kHz) of a wider system bandwidth. As used herein, LTE Release 13 (Rel-13) narrowband internet of things (NB-IOT) may refer to a 180 kHz narrowband region of a wider system bandwidth.

As used herein, "MTC" may refer to machine type communication(s) or internet of things, such as NB-IOT. MTC UE generally refers to a UE that communicates via a radio network but is not regularly used for delivering communications directly to a user, such as electric meters that report electricity usage data to billing system computers. As used herein, the term "MTC UE" may refer to an MTC UE that utilizes an entire system bandwidth (e.g., an LTE Release 12 (Rel-12) MTC UE), an MTC UE that utilizes a 1.08 MHz narrowband region of a larger system bandwidth (e.g., an LTE Release 13 (Rel-13) enhanced or evolved MTC (eMTC) UE), and/or an MTC UE that utilizes a smaller narrowband region (e.g., 180 kHz) of a wider system bandwidth (e.g., a Rel-13 NB-IOT MTC UE). While aspects of the present disclosure are described in terms of MTC UEs that utilize a 1.08 MHz (e.g., 6 RBs) narrowband region of a larger system bandwidth for convenience, these descriptions are not limiting of the present disclosure. Aspects of the present disclosure may be utilized with MTC UEs that utilize an entire system bandwidth, MTC UEs that utilize a 1.08 MHz narrowband region of a larger system bandwidth, and MTC UEs that utilize a smaller narrowband region (e.g., 180 kHz) of a wider system bandwidth. MTC UEs include devices such as sensors, monitors, meters, location tags, security devices, robots/robotic devices, drones, etc. To enhance coverage of certain devices, such as MTC UEs, "bundling" may be utilized in which certain transmissions are sent as a bundle of transmissions, for example, with the same information transmitted over multiple subframes.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. Some examples of UEs may include cellular phones (e.g., smart phones), personal digital assistants (PDAs), wireless modems, handheld devices, tablets, laptop computers, netbooks, smartbooks, ultrabooks, wearable devices (e.g., smart watches, smart bracelets, smart clothing, smart glasses, smart goggles, heads-up displays), robots/robotic devices, drones, entertainment devices (e.g., music players, gaming devices), cameras, navigation devices, vehicular devices, medical devices, healthcare devices, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
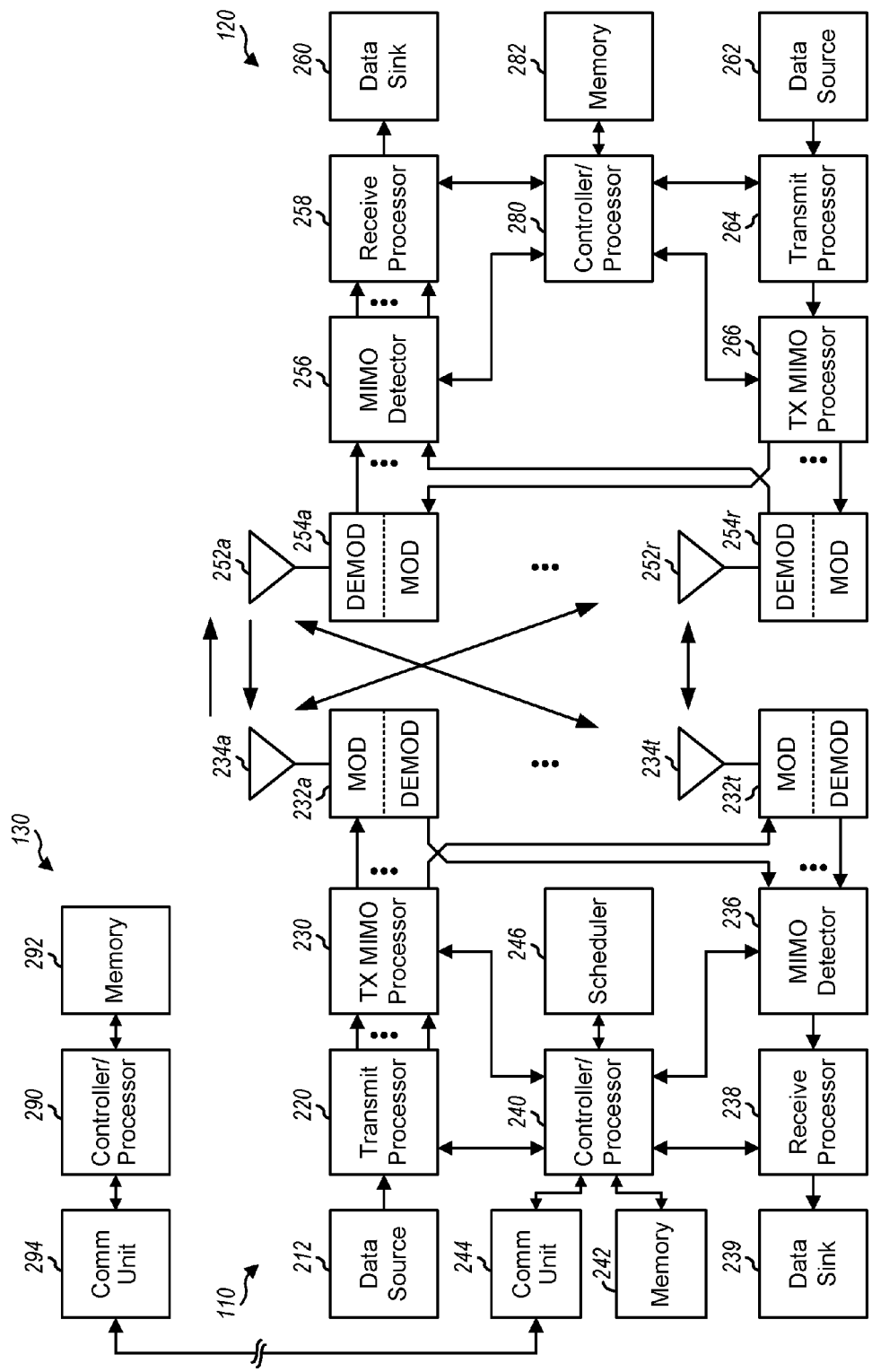
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, controller/processor 240 and/or other controllers, processors and modules at base station 110 may, for example, perform direct operations 700 shown in FIG. 7. Similarly, controller/processor 280 and/or other controllers, processors and modules at UE 120 may, for example, perform or direct operations 800 shown in FIG. 8 and operations 900 shown in FIG. 9. Memories 242 and 282 may store data and program codes for base station 110 and UE 120, respectively. A scheduler 246 may schedule UEs for data transmission on the downlink and/or uplink.

Figure 3:
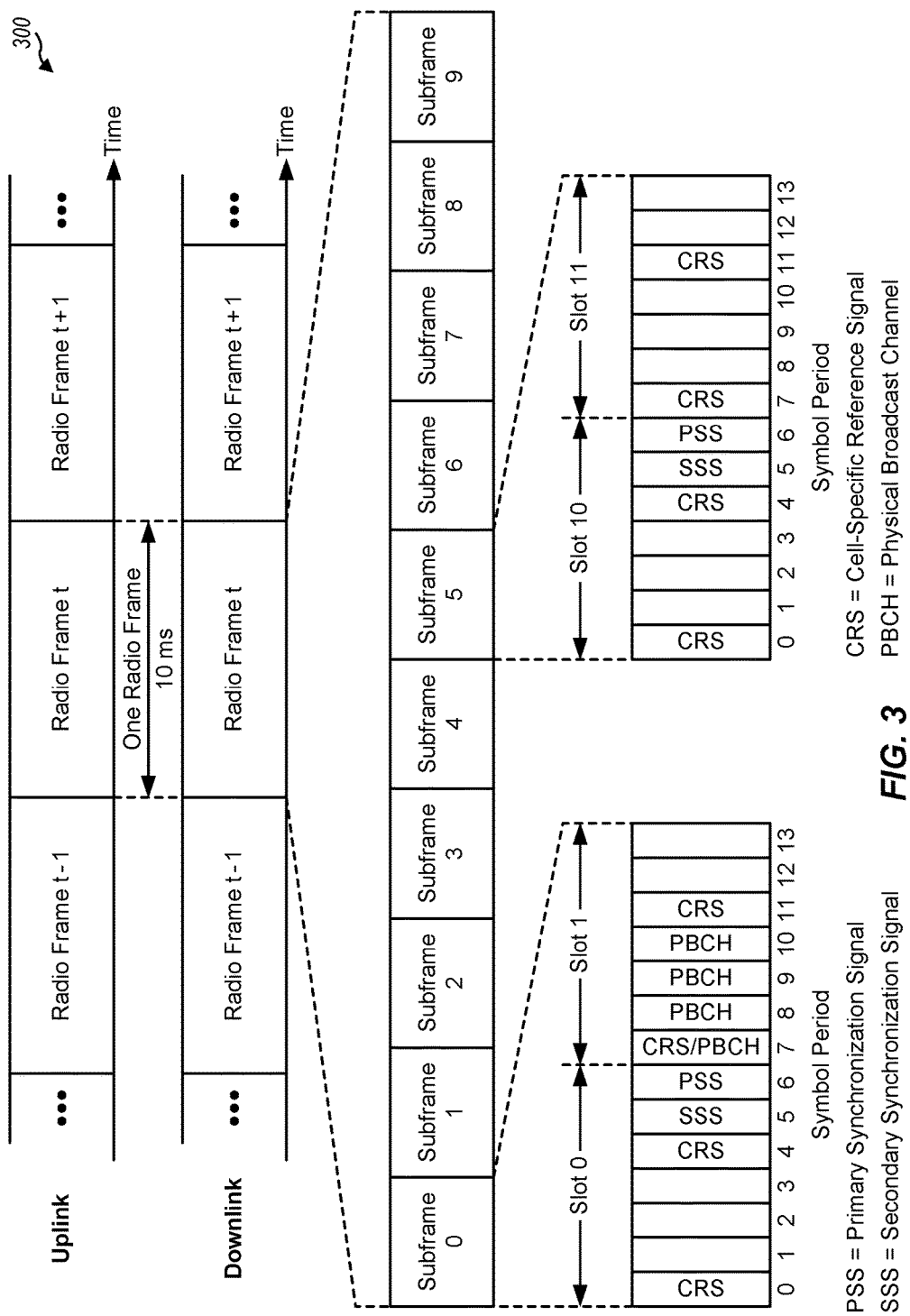
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
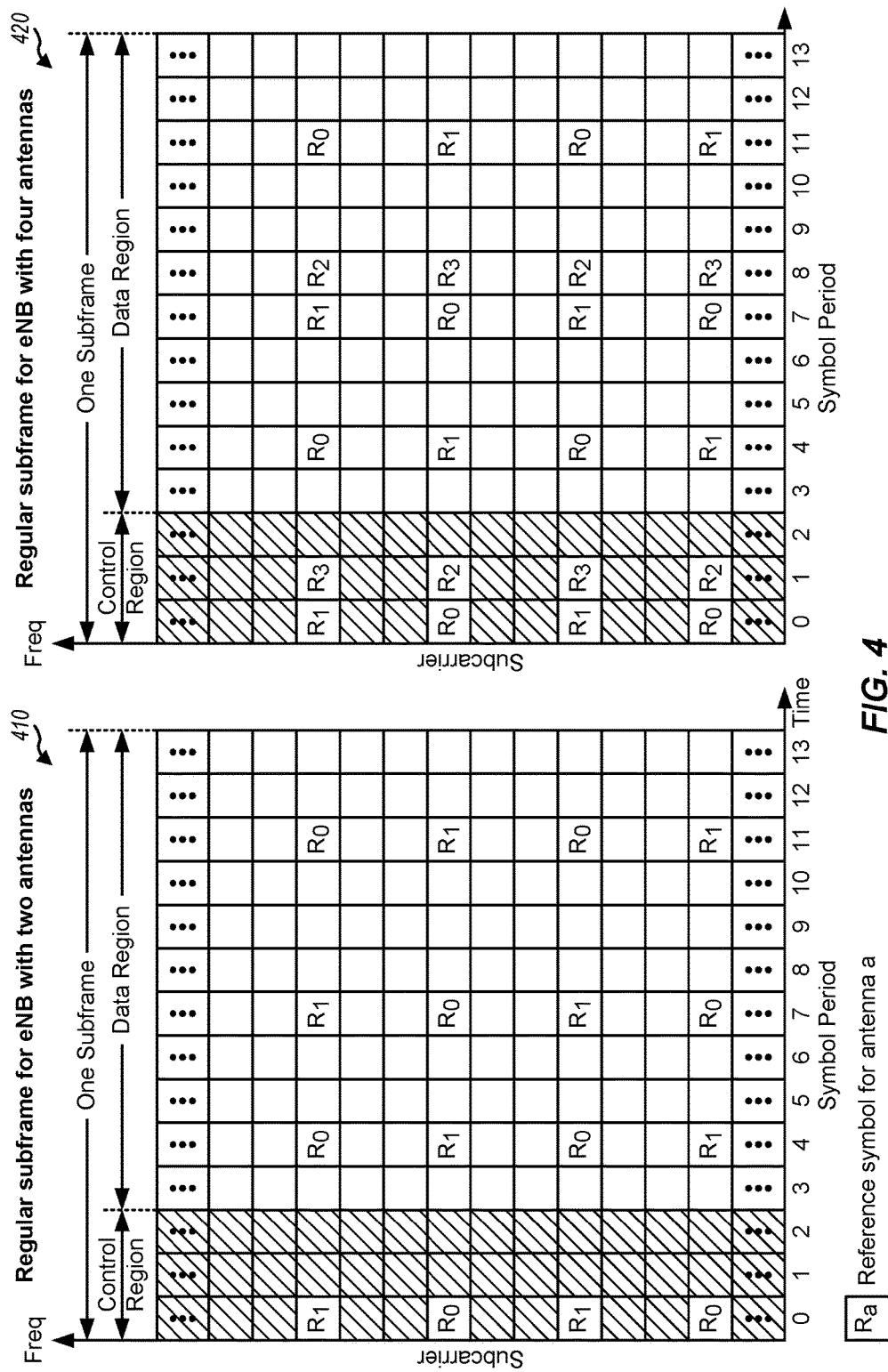
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Control Channel Design for Machine Type Communications

As noted above, aspects of the present disclosure provide techniques for signalling control channels to machine type communication (MTC) devices that may use a narrowband region of a larger system bandwidth. Such a narrowband region may be, for example, a Rel-13 eMTC narrowband with 1.08 MHz (e.g., six RBs) of bandwidth or a Rel-13 NB-IOT narrowband with 180 kHz (e.g., one RB) of bandwidth.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, it is desirable that low cost, low rate devices be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 µs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB, which may be achieved, for example, by transmission time interval (TTI) bundling of various channels (e.g., PDSCH, PUSCH, PRACH, and/or MPDCCH).

Figure 5:
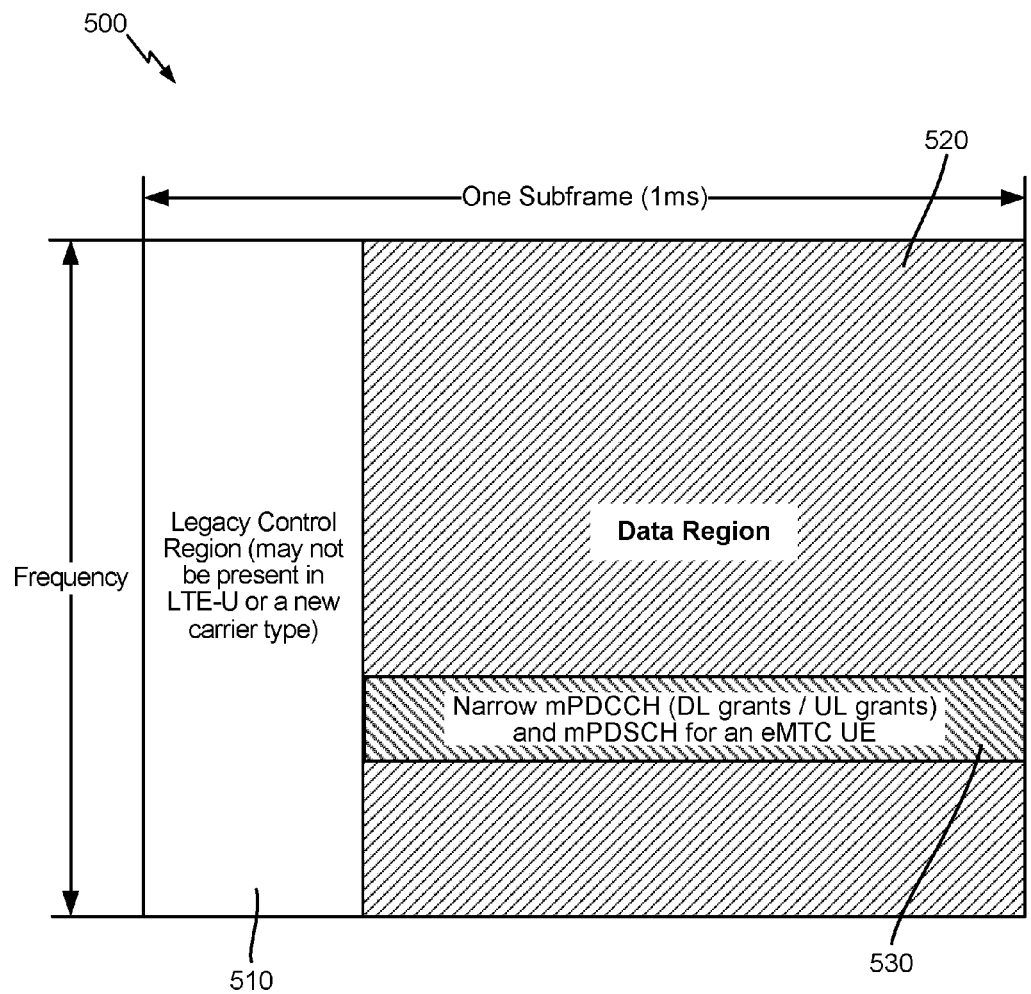
FIG. 5 illustrates an exemplary subframe configuration for eMTC, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 resource blocks (RBs) and may use demodulation reference signals (DM-RS) for demodulation.

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks).

In Release 11, an enhanced physical downlink control channel (ePDCCH) was introduced. In contrast to the PDCCH which spans a first few symbols in a subframe, the ePDCCH is frequency division multiplexing (FDM) based and spans (symbols of) the entire subframe. Additionally, as compared to the conventional PDCCH CRS support, the ePDCCH may only support DM-RS.

In some cases, the ePDCCH may be UE-specifically configured. For example, each UE in a network may be configured to monitor a different set of resources for an ePDCCH directed to that UE. Additionally, the ePDCCH supports two modes of operation: localized ePDCCH, in which a single precoder is applied to each PRB, and distributed ePDCCH, in which two precoders cycle through the allocated resources within each PRB pair.

The ePDCCH may be constructed based on enhanced resource element groups (eREG) and enhanced control channel elements (eCCE). Generally, an eREG is defined by excluding DM-RS REs, assuming a maximum amount of DM-RS (e.g., 24 DM-RS REs in subframes using normal cyclic prefix and 16 DM-RS REs in subframes using extended cyclic prefix), and including any non-DM-RS REs (REs that do not carry DM-RS). Thus, in subframes using normal cyclic prefix, the number of eREGs available for the ePDCCH is 144 (12 subcarriers×14 symbols−24 DM-RS=144 REs), and, for extended cyclic prefix, the number of REs available for the ePDCCH is 128 (12 subcarriers*12 symbols−16 DM-RS=128 REs).

In some cases, a PRB pair is divided into 16 eREGs, regardless of subframe type, cyclic prefix type, PRB pair index, subframe index, etc. Thus, in subframes using normal cyclic prefix, there are 9 REs per eREG, and there are 8 REs per eREG in subframes using extended cyclic prefix. In some cases the eREG to RE mapping may follow a cyclic/sequential and frequency-first-time-second manner, which may be beneficial to equalizing the number of available REs per eREG. Additionally, due to the presence of other signals, the number of available REs for the ePDCCH may not be fixed and can be different for different eREGs in a PRB pair.

As mentioned above, MTC and/or eMTC operation may be supported in the wireless communication network (e.g., in coexistence with LTE or some other RAT). FIGS. 6A and 6B, for example, illustrate an example of how MTC UEs in MTC operation may co-exist within a wideband system, such as LTE.

As illustrated in the example frame structure of FIG. 6A, subframes 610 associated with MTC and/or eMTC operation may be time division multiplexed (TDM) with regular subframes 620 associated with LTE (or some other RAT).

Additionally or alternatively, as illustrated in the example frame structure of FIG. 6B, one or more narrowbands 650 used by MTC UEs in MTC may be frequency division multiplexed (FDM) within the wider bandwidth 660 supported by LTE. Multiple narrowband regions, with each narrowband region spanning a bandwidth that is no greater than a total of 6 RBs, may be supported for MTC and/or eMTC operation. In some cases, each MTC UE in MTC operation may operate within one narrowband region (e.g., at 1.4 MHz or 6 RBs) at a time. However, MTC UEs in MTC operation, at any given time, may re-tune to other narrowband regions in the wider system bandwidth. In some examples, multiple MTC UEs may be served by the same narrowband region. In other examples, multiple MTC UEs may be served by different narrowband regions (e.g., with each narrowband region spanning 6 RBs, or as mentioned above, a smaller number of RBs). In yet other examples, different combinations of MTC UEs may be served by one or more same narrowband regions and/or one or more different narrowband regions.

The MTC UEs may operate (e.g., monitor/receive/transmit) within the narrowband regions for various different operations. For example, as shown in FIG. 5B, a first narrowband region (e.g., spanning no more than 6 RBs of the wideband data) of a subframe may be monitored by one or more MTC UEs for either a PSS, SSS, PBCH, MTC signaling, or paging transmission from a BS in the wireless communication network. As also shown in FIG. 6B, a second narrowband region (e.g., also spanning no more than 6 RBs of the wideband data) of a subframe may be used by MTC UEs to transmit a RACH or data previously configured in signaling received from a BS. In some cases, the second narrowband region may be utilized by the same MTC UEs that utilized the first narrowband region (e.g., the MTC UEs may have re-tuned to the second narrowband region to transmit after monitoring in the first narrowband region). In some cases (although not shown), the second narrowband region may be utilized by different MTC UEs than the MTC UEs that utilized the first narrowband region.

Although the examples described herein assume a narrowband of 6 RBs, those skilled in the art will recognize that the techniques presented herein may also be applied to different sizes of narrowband regions (e.g., 1 RB, etc.).

Example Machine Type Communications Operations Utilizing Shared Radio Frequency Spectrum As noted above, devices operating in SRFS perform LBT. An MTC UE may not be capable of simultaneously receiving over multiple narrowband regions of an SRFS band. Such an MTC UE should detect a transmission that occupies a wideband (e.g., a 20 MHz wide band) region of an SRFS band while receiving from one narrowband region of the wideband region. The quantity of energy in the narrowband region is less than the total energy of the transmission, which is spread over the entire wideband region. According to aspects of the present disclosure, techniques for an MTC UE to perform energy detection over a narrowband region of an SRFS band as part of a CCA are provided.

As mentioned previously, MTC devices may transmit and receive bundled transmissions for coverage enhancement and other reasons. Previously used techniques of LBT (e.g., IEEE 802.11 CCAs) may not receive for a long enough period of time to determine the frequency band is not going to be used by another device for the entire length of a bundled transmission. According to aspects of the present disclosure, techniques for a BS or UE performing MTC operations to perform CCAs for longer periods of time to accommodate the durations of bundled transmissions are provided.

According to aspects of the present disclosure, a BS (e.g., an eNB) acting as a controller of a cell supporting MTC UEs may perform a CCA or enhanced CCA (eCCA) over an SRFS band, and then transmit a Wi-Fi (e.g., IEEE 802.11ax) preamble reserving the SRFS band for a period of time equal to the sum of the time for the BS to transmit assignments of transmission resources to one or more UEs and the time for the UEs to follow the assignments (e.g., by transmitting or receiving per the assignments). The assignments may be conveyed via one or more PDCCHs and/or ePDCCHs, which may be bundled. Bundling (e.g., of transmissions by the BS and transmissions by a UE) may be taken into account when the BS computes the period of time to reserve the SRFS band. The assignments may be for the one or more MTC UEs to transmit or receive bundled and/or non-bundled transmissions on narrowband regions of the SRFS band. The MTC UEs may follow the one or more assignments without performing a CCA, because the Wi-Fi preamble transmitted by the BS reserved the SRFS band for the duration of the operations by the MTC UEs.

According to aspects of the present disclosure, the preamble transmitted by the BS may be a wideband (e.g., a 20 MHz wide frequency band) preamble. The wideband preamble may be detectable by both MTC UEs and non-MTC UEs. The wideband preamble may be decodable by devices that can receive a wideband signal (e.g., non-MTC UEs and BSs) and may reserve a wideband region of the SRFS band for a period of time.

According to aspects of the present disclosure, the BS may transmit a narrowband preamble over a narrowband region of the SRFS band subsequent to transmitting a wideband preamble. The wideband preamble may be decodable by devices that can receive a wideband signal (e.g., non-MTC UEs and BSs) and reserve a wideband region of the SRFS band for a period of time. The narrowband preamble may be decodable by both devices that can receive a wideband signal and devices that cannot (e.g., MTC UEs). The narrowband preamble may reserve the narrowband region of the SRFS band for a period of time. Devices decoding either the wideband preamble or the narrowband preamble may refrain from transmitting over the reserved regions (either wideband or narrowband) for the periods of time indicated by the preambles.

According to aspects of the present disclosure, a device (e.g., a BS, non-MTC UE, or MTC UE) may perform a CCA prior to transmitting a bundled transmission on a narrowband region of an SRFS band and may compute a duration for the CCA based on a duration of the bundled transmission. The duration of the bundled transmission may be computed as a number of transmission time intervals (TTIs) used for transmitting the bundled transmission. The computed duration for the CCA may be only a fraction (e.g., 1/20) of the duration of the bundled transmission. For example, a BS may determine to transmit a bundled PDCCH over eight TTIs (e.g., milliseconds) over a narrowband region of an SRFS band. In the example, the BS may compute the duration of a CCA to perform before starting transmission of the bundled PDCCH as 8/20 of a TTI.

According to aspects of the present disclosure, a BS may transmit an indication of downlink transmissions over a narrowband region of an SRFS band prior to transmitting the downlink transmissions. That is, a BS may transmit an indication over a narrowband region of a downlink transmission to be transmitted over the narrowband region. The BS may transmit the indication prior to performing a CCA for the indicated downlink transmission. The indication may be, for example, an M sequence, a Chu sequence, or a downlink channel usage beacon signal (D-CUBS). A UE receiving the indication may cause a receiver of the UE to remain powered on and active for a duration exceeding a computed duration of a CCA to be performed by the BS. The UE may begin searching for the indicated DL signal at the end of the computed duration of the CCA. If the UE begins receiving a signal from the BS before the end of the duration, then the UE may continue to have the receiver powered on and active at least until the UE has received the DL transmission. For example, a UE may be operating in a coverage enhancement regime wherein transmissions from a serving BS of the UE are bundled over four TTIs. In the example, the serving BS may transmit a Chu sequence in a narrowband region of an SRFS band to indicate that the serving BS is going to transmit a DL signal to the UE. Still in the example, the UE decodes the Chu sequence and calculates that a CCA performed by the BS will have a duration of 4/20 of a TTI. Still in the example, the UE determines to leave the receiver of the UE activated and to begin searching for a DL signal from the BS 4/20 of a TTI after receiving the Chu sequence. The indication may be, for example, a narrowband PCFICH, transmitted in the narrowband which the intended UE monitors. The narrowband PCFICH signal can further indicate downlink and uplink channel split, PLMN information, and/or other information.

According to aspects of the present disclosure, a BS may provide an indication of one or more TTIs to be used by a UE for transmitting a random access channel (RACH) signal over a narrowband region of an SRFS band to the BS. A UE receiving the indication may determine to delay transmitting a RACH signal to the BS over the narrowband region until the indicated TTIs.

According to aspects of the present disclosure, a UE may transmit channel state information (CSI) feedback to a BS over a narrowband region of an SRFS band. For aperiodic CSI feedback to a BS, the BS may trigger the UE to provide aperiodic CSI feedback regarding the narrowband region by requesting the CSI feedback in a grant transmitted to the UE. The BS may reserve a wideband region including the narrowband region or only the narrowband region by transmitting a preamble, as described above. The UE may transmit the aperiodic CSI feedback on the narrowband region without performing a CCA according to the grant received from the BS. For periodic CSI feedback, a BS may indicate a periodic opportunity window for a UE to transmit periodic CSI feedback on the narrowband region of the SRFS band. A UE may perform a CCA on the narrowband region of the SRFS band prior to transmitting a periodic CSI feedback report to the BS over the narrowband region.

According to aspects of the present disclosure, a BS (e.g., an eNB) acting as a controller of a cell supporting MTC UEs may perform a CCA or enhanced CCA (eCCA) over an SRFS band before transmitting to an MTC UE on a narrowband region of the SRFS band.

According to aspects of the present disclosure, an MTC UE may perform a CCA or eCCA on a narrowband region of the SRFS band before transmitting on the narrowband region of the SRFS band. A UE performing a CCA or eCCA on a narrowband region of an SRFS band may compute a threshold energy level to be used in the CCA or eCCA, based on the size of the narrowband region and the size of a wideband region including the narrowband region. For example, if a UE is performing a CCA for a 1.08 MHz (e.g., 6 RBs) narrowband region included in a 20 MHz (e.g., 110 RBs) wideband region, then the UE may compute a threshold energy level for the CCA that differs from a threshold energy level for a 20 MHz channel. In the example, the UE may determine (e.g., by looking up in a table) that a threshold energy level of −62 dBm is used for a 20 MHz channel. Still in the example, the UE may compute a threshold energy level for the CCA by using the equation:

$$E_{CCA,NB} = E_{CCA,WB} - 10 \log_{10}(WB/NB) \quad (1),$$

where $E_{CCA,NB}$ is the threshold energy level for the narrowband CCA, $E_{CCA,WB}$ is the threshold energy level for a wideband CCA, WB is the bandwidth of the wideband region, and NB is the bandwidth of the narrowband region.

Still in the example, the UE may compute a threshold energy level for the CCA of −75 dBm=−62 dBm−10 log$_{10}$ (20 MHz/1.08 MHz)

Figure 7:
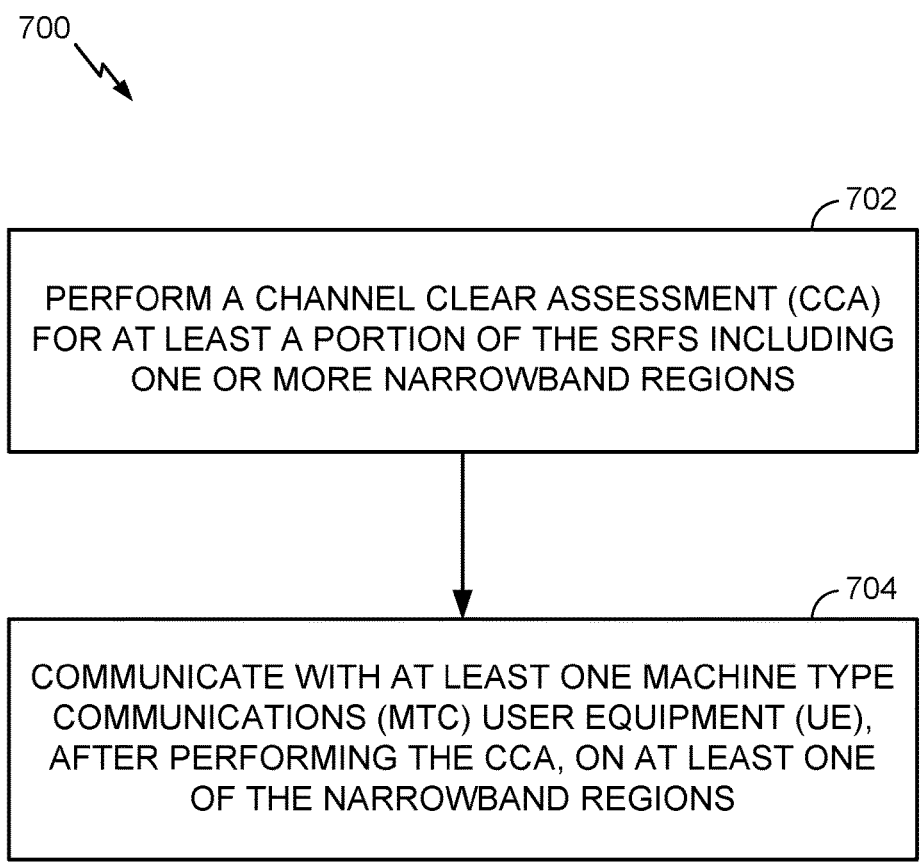
FIG. 7 illustrates example operations for wireless communications by a base station (BS), in accordance with certain aspects of the present disclosure.

FIG. 7 illustrates example operations 700 for wireless communication by a base station (BS) using a shared radio frequency spectrum (SRFS) band, in accordance with certain aspects of the present disclosure described above. Operations 700 may be performed by a BS such as eNB 110a shown in FIG. 1.

Operations 700 begin at 702, by performing a channel clear assessment (CCA) for at least a portion of the SRFS including one or more narrowband regions. At 704, the operation continues by the BS communicating with at least one machine type communications (MTC) user equipment (UE), after performing the CCA, on at least one of the narrowband regions.

Figure 8:
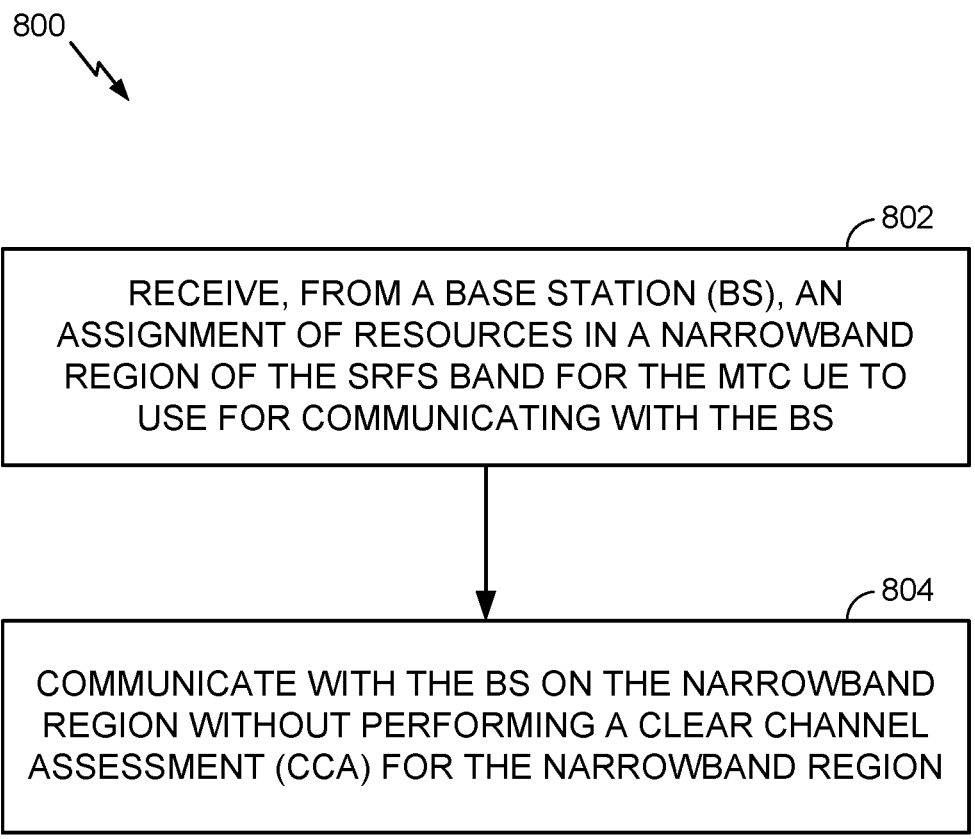
FIG. 8 illustrates example operations for wireless communications, by an MTC user equipment (UE), in accordance with certain aspects of the present disclosure.

FIG. 8 illustrates example operations 800 for wireless communication by a machine type communications (MTC) user equipment (UE) using a shared radio frequency spectrum (SRFS) band, in accordance with certain aspects of the present disclosure described above. Operations 800 may be performed by an MTC UE, such as UE 120d shown in FIG. 1.

Operations 800 begin at 802, by the MTC UE receiving, from a base station (BS), an assignment of resources in a narrowband region of the SRFS band for the MTC UE to use for communicating with the BS. At 804, the operation continues by the MTC UE communicating with the BS on the narrowband region without performing a clear channel assessment (CCA) for the narrowband region.

Figure 9:
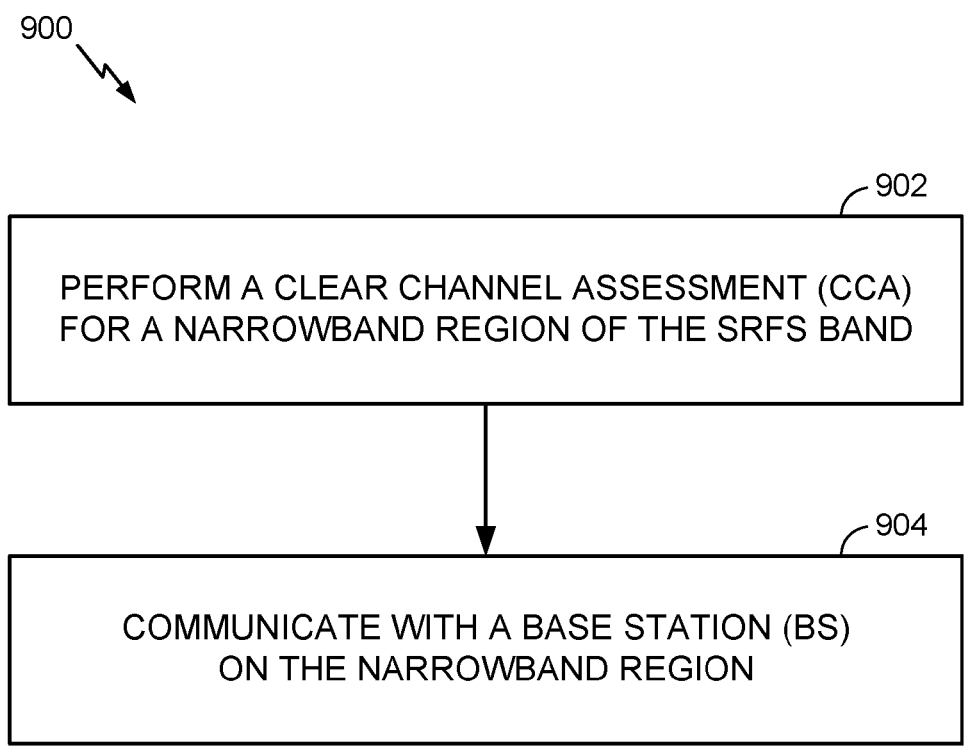
FIG. 9 illustrates example operations for wireless communications, by an MTC user equipment (UE), in accordance with certain aspects of the present disclosure.

FIG. 9 illustrates example operations 900 for wireless communication by a machine type communications (MTC) user equipment (UE) using a shared radio frequency spectrum (SRFS) band, in accordance with certain aspects of the present disclosure described above. Operations 900 may be performed by an MTC UE, such as UE 120d shown in FIG. 1.

Operations 900 begin at 902, by the MTC UE performing a clear channel assessment (CCA) for a narrowband region of the SRFS band. At 904, the operation continues by the MTC UE communicating with a base station (BS) on the narrowband region.

In current (e.g., Release 12) LTE wireless communication protocols, a BS (e.g., eNB 110*a* shown in FIG. 1) may transmit discovery reference signals (DRS). DRS may include the previously mentioned PSS, SSS, CRS, and CSI-RS. The discovery reference signals may permit UEs served in neighboring cells to measure strength of signals (e.g., DRS), which measurements the UEs may use in determining whether to reselect to a cell served by the BS. A UE may be configured (e.g., by the UE's serving BS) with a bandwidth in which the UE measures DRS. For example, a UE may be configured to measure DRS in a bandwidth of a neighboring cell to determine if the UE should reselect to the neighboring cell. The configured bandwidth for a UE may be 1.4 MHz, 3 MHz, 5 MHz, 10 MHz, 15 MHz, or 20 MHz.

According to aspects of the present disclosure, a BS may configure narrowband DRS and transmit the narrowband DRS in one or more narrowband regions of a wider system bandwidth. The narrowband DRS may be transmitted in the same frequency bands or different frequency bands as normal (non-narrowband) DRS. The narrowband DRS may be use different periodicities and/or subframe offsets as normal DRS. For example and with reference to FIG. 3, a BS may transmit normal PSS and normal SSS in symbols 6 and 5, respectively, of subframes 0 and 5 of every frame. Still in the example, the BS may configure and transmit narrowband PSS and narrowband SSS in symbols 9 and 8, respectively, of subframes 2 and 7 of every frame. Still in the example and with reference to FIG. 5, the normal PSS and normal SSS may be transmitted in the center 6 RBs of a wider system bandwidth, while the narrowband PSS and narrowband SSS may be transmitted in the narrowband region 530.

According to aspects of the present disclosure, a UE (e.g., an MTC UE) may be configured (e.g., by a serving BS of the UE) to search for and/or measure narrowband DRS in a narrowband region of a wider system bandwidth. The narrowband region may be, for example, a Rel-13 eMTC narrowband with 1.08 MHz (e.g., six RBs) of bandwidth or a Rel-13 NB-IOT narrowband with 180 kHz (e.g., one RB) of bandwidth. The UE may measure narrowband DRS and report the measurements to a serving BS. For example and with reference to FIG. 5, an MTC UE may be configured to measure narrowband CRS in the narrowband region 530 and report the measurements to a serving BS of the UE.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, data, code, or any combination thereof, whether referred to as software, firmware, middleware, code, microcode, hardware description language, machine language, or otherwise. Generally, where there are operations illustrated in Figures, those operations may be performed by any suitable corresponding means-plus-function components.

For example, means for performing may include one or more controllers or processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving and/or means for communicating may comprise, e.g., the receive processor 258 and/or an antenna(s) 252 of the user terminal 120 illustrated in FIG. 2, the transmit processor 220 and/or an antenna(s) 234 of the eNB 110 illustrated in FIG. 2, etc. Means for transmitting and/or means for sending may comprise, e.g., the transmit processor 220 and/or an antenna(s) 234 of the eNB illustrated in FIG. 2. Means for determining may comprise, e.g., the controller/processor 280 and memory 282 of the user terminal 120 illustrated in FIG. 2 and/or the controller processor 240 and memory 242 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS) using a shared radio frequency spectrum (SRFS) band, comprising:
   performing a channel clear assessment (CCA) for at least a portion of the SRFS including one or more narrowband regions;
   transmitting a wideband preamble on a wideband region of at least seven resource blocks (RBs) including a plurality of the narrowband regions to reserve the one or more narrowband regions; and
   communicating with at least one machine type communications (MTC) user equipment (UE), after performing the CCA, on at least one of the one or more narrowband regions.

2. The method of claim 1, wherein the wideband preamble is detectable by both MTC UEs and non-MTC UEs.

3. The method of claim 1, further comprising transmitting at least one narrowband preamble after transmitting the wideband preamble.

4. The method of claim 1, further comprising transmitting an assignment of resources in the one or more narrowband regions for the UE to use for communicating with the BS.

5. The method of claim 1, wherein performing the CCA comprises performing the CCA over a wideband region including a plurality of the narrowband regions.

6. The method of claim 1, wherein:
   communicating with the at least one MTC UE comprises sending downlink transmissions to the at least one MTC UE, the downlink transmissions sent as bundled transmissions over a plurality of transmission time intervals (TTIs); and
   performing the CCA comprises performing the CCA over a window having a duration corresponding to only a fraction of the plurality of TTIs.

7. The method of claim 1, wherein:
   communicating with the at least one MTC UE comprises sending downlink transmissions to the at least one MTC UE; and
   the method further comprises transmitting an indication, in at least one narrowband region, of the downlink transmissions prior to transmitting the downlink transmissions.

8. The method of claim 7, wherein transmitting the indication comprises transmitting at least one of an M sequence, a Chu sequence, or a downlink channel usage beacon signal (D-CUBS).

9. The method of claim 1, wherein:
   communicating with the at least one MTC UE comprises receiving a random access channel (RACH) transmission from the UE; and
   the method further comprises providing, to the at least one MTC UE, an indication of transmission time intervals (TTIs) for transmitting the RACH.

10. The method of claim 1, wherein:
    communicating with the at least one MTC UE comprises receiving channel state information (CSI) feedback from the at least one MTC UE.

11. The method of claim 1, further comprising:
    transmitting at least one discovery reference signal (DRS) on at least one of the narrowband regions.

12. The method of claim 11, further comprising:
    sending, to the at least one MTC UE, a configuration that configures the at least one MTC UE to receive at least one discovery reference signal (DRS) on at least one of the narrowband regions.

13. An apparatus for wireless communications using a shared radio frequency spectrum (SRFS) band, comprising:
    at least one processor configured to:
       perform a channel clear assessment (CCA) for at least a portion of the SRFS including one or more narrowband regions;
       transmit a wideband preamble on a wideband region of at least seven resource blocks (RBs) including a plurality of the narrowband regions to reserve the one or more narrowband regions; and
       communicate with at least one machine type communications (MTC) user equipment (UE), after performing the CCA, on at least one of the one or more narrowband regions; and
    a memory coupled to the at least one processor.

14. The apparatus of claim 13, wherein the wideband preamble is detectable by both MTC UEs and non-MTC UEs.

15. The apparatus of claim 13, wherein the at least one processor is further configured to transmit at least one narrowband preamble after transmitting the wideband preamble.

16. The apparatus of claim 13, wherein the at least one processor is further configured to transmit an assignment of resources in the one or more narrowband regions for the UE to use for communicating with the BS.

17. The apparatus of claim 13, wherein the at least one processor is configured to perform the CCA over a wideband region including a plurality of the narrowband regions.

18. The apparatus of claim 13, wherein the at least one processor is configured to:
communicate with the at least one MTC UE by sending downlink transmissions to the at least one MTC UE, the downlink transmissions sent as bundled transmissions over a plurality of transmission time intervals (TTIs); and
perform the CCA by performing the CCA over a window having a duration corresponding to only a fraction of the plurality of TTIs.

19. The apparatus of claim 13, wherein the at least one processor is configured to:
communicate with the at least one MTC UE by sending downlink transmissions to the at least one MTC UE; and
transmit an indication, in at least one narrowband region, of the downlink transmissions prior to transmitting the downlink transmissions.

20. The apparatus of claim 19, wherein the at least one processor is configured to transmit the indication by transmitting at least one of an M sequence, a Chu sequence, or a downlink channel usage beacon signal (D-CUBS).

21. The apparatus of claim 13, wherein the at least one processor is configured to:
communicate with the at least one MTC UE by receiving a random access channel (RACH) transmission from the UE; and
provide, to the at least one MTC UE, an indication of transmission time intervals (TTIs) for transmitting the RACH.

22. The apparatus of claim 13, wherein the at least one processor is configured to:
communicate with the at least one MTC UE by receiving channel state information (CSI) feedback from the at least one MTC UE.

23. The apparatus of claim 13, wherein the at least one processor is further configured to:
transmit at least one discovery reference signal (DRS) on at least one of the narrowband regions.

24. The apparatus of claim 13, wherein the at least one processor is further configured to:
send, to the at least one MTC UE, a configuration that configures the at least one MTC UE to receive at least one discovery reference signal (DRS) on at least one of the narrowband regions.

25. An apparatus for wireless communications, comprising:
means for performing a channel clear assessment (CCA) for at least a portion of the SRFS including one or more narrowband regions;
means for transmitting a wideband preamble on a wideband region of at least seven resource blocks (RBs) including a plurality of the narrowband regions to reserve the one or more narrowband regions; and
means for communicating with at least one machine type communications (MTC) user equipment (UE), after performing the CCA, on at least one of the one or more narrowband regions.

26. A non-transitory computer readable medium comprising instructions, the instructions when executed by a processing system causing the processing system to execute operations comprising:
performing a channel clear assessment (CCA) for at least a portion of the SRFS including one or more narrowband regions;
transmitting a wideband preamble on a wideband region of at least seven resource blocks (RBs) including a plurality of the narrowband regions to reserve the one or more narrowband regions; and
communicating with at least one machine type communications (MTC) user equipment (UE), after performing the CCA, on at least one of the one or more narrowband regions.

* * * * *